United States Patent Office 3,562,244
Patented Feb. 9, 1971

3,562,244
8-L-ORNITHINE VASOTOCIN AND INTERMEDIATES THEREFOR
Miklos Bodanszky, Princeton, and Miguel A. Ondetti, Highland Park, N.J., assignors, by mesne assignments, to E. R. Squibb & Sons, Inc., New York, N.Y., a corporation of Delaware
No Drawing. Filed Sept. 12, 1963, Ser. No. 308,368
Int. Cl. C07c *103/52;* C07d *27/52*
U.S. Cl. 260—112.5      1 Claim

ABSTRACT OF THE DISCLOSURE

8-L-ornithine vasotocin, 8-L-ornithine vasopressin, process for their synthesis and intermediates therefor. A process for converting ornithine peptides (e.g., 8-L-ornithine vastocin and 8-L-ornithine vasopressin) into the corresponding arginine peptides by treatment with 1-guanyl-3,5-dimethylpyrazole, $HNO_3$ and other guanylating agents.

---

This invention relates to a new and improved process for preparing arginine containing peptides and new intermediates utilizable therein.

It is well known that the preparation of peptides containing the amino acid, arginine is difficult since arginine, having the structure:

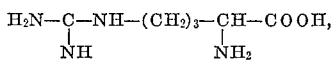

contains the extremely basic guanidino group, which if left unprotected, complicates the desired acylation with other amino acids or peptides to yield simple peptides or more complex peptides. Prior to this invention a number of protecting groups have been used to mask the basic properties of the guanidino group of arginine, but none of these has been completely satisfactory from the point of view of avoiding side reactions or permitting of the removal of the thus added protecting group at the appropriate stage of the peptide synthesis.

Among such previously suggested methods has been one that instead of an arginine containing peptide reagent or arginine itself, the corresponding ornithine containing peptide reagent or ornithine, an amino acid of the structure:

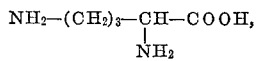

be used, followed by coversion of the delta-amino group to a guanido group in the usual manner as by treatment with cyanamide, guanidine, S-methylisothiourea, O-methylisourea, etc. [J. S. Fruton, "Advances in Protein Chemistry," vol. 5, p. 64 (1949)]. In order to use such method the delta-amino group had to be protected. However, despite the previous attempts to protect this amino group, undesired cyclization side reactions occurred with extreme case, thereby yielding unwanted lactam structures.

It is an object of this invention, therefore, to provide an improved process for preparing arginine and ornithine containing peptides in high yield without excessive amounts of undesired by-products.

It is another object of this invention to provide a new class of compounds, namely, phthalyl derivatives of ornithine and ornithine containing peptides.

It is still another object of this invention to provide new ornithine containing peptides.

These objects are achieved by the process of this invention which essentially comprises treating new compounds of this invention of the general Formula I:

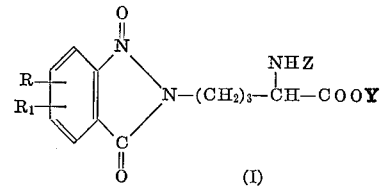

wherein R and $R_1$ are the same or different and represent hydrogen, lower alkyl (e.g., methyl, ethyl, propyl, n- pentyl and n-hexyl), halogen (e.g., chloro and bromo), nitro, and lower alkoxy (e.g., methoxy and ethoxy); Y is hydrogen, an alkali metal (e.g., sodium and potassium), a group to protect the acid radical (if reaction is desired with the alpha-amino group), such as an amino acid group, a peptide acid group, an amino acid ester group and a peptide ester group, or any other such group well known in the art, or an activating group (if reaction is desired with the acid group), such as a p-nitrophenyl, m-nitrophenyl, o-nitrophenyl, p-cyanophenyl, p-fluorophenyl, 2,4-dinitrophenyl, 3,5-dinitrophenyl, 2,4-dichlorophenyl, p-sulfonphenyl, and p-carbomethoxyphenyl, or any other such group well known in the art; and Z is hydrogen, a group to protect the amino radical (if reaction is desired with the acid group), such as an amino acyl group, a peptide acyl group, α-benzyloxycarbonyl, trityl, trifluoroacetyl, and tert.-butoxy carbonyl, or any other such group well known in the art; and acid-addition salts of those compounds wherein Z is hydrogen.

Since the phthalyl substituent on the delta-amino group of the ornithine or ornithine portion of the peptide replaces both hydrogen atoms, there is full protection against unwanted acylation at this position and also unwanted cyclization. Moreover, the phthalyl group can easily be removed at any stage of the peptide synthesis, as by treatment with hydrazine, mono-substituted hydrazines, such as phenylhydrazine, etc., to yield the free delta-amino group, which can then be guanylated in the usual manner, as by treatment with one of the guanylating reagents previously mentioned or with 1-guanyl-3,5-dimethylpyrazole, thereby yielding the desired arginine containing peptide product. Both the removal of the phthalyl group and the guanylation are preferably conducted in an organic solvent, such as dimethylformamide, a mixture of a lower alkanol (e.g., methanol) and chloroform, or dioxane containing methanol, etc.

The new intermediates of this invention of the Formula I are readily prepared by reaction ornithine with a copper salt, such as cupric sulfate, and treating the resulting copper complex with a carbo(lower alkoxy)phthalimide of the Formula II:

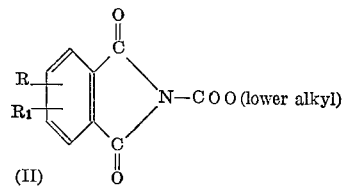

wherein R and $R_1$ are as hereinbefore defined. The resulting copper complex is then destroyed, as by treating with water $H_2S$ or with an acid, such as a mineral acid (e.g., hydrochloric acid) to yield a compound of the Formula I, wherein Z is hydrogen, in the form of its acid-addition salt. The ornithine derivative thus protected on its alpha-amino group can be provided with a different protecting group on its alpha-amino group, such as benzyloxycarbonyl, etc., as described above and then can also be converted into a derivative with an activated carboxyl group such as active ester, etc., or with a protecting group on the carboxyl.

3

The resulting new intermediates of this invention of the Formula I are then reacted with the desired amino acid or peptide, containing either a free α-amino group or an activated acyl group, depending on whether the addition is to occur on the α-amino group of the phthalylated ornithine or ornithine containing peptide or the carboxylic acid group of said compound, in the usual manner, and the process can then be continued in the usual manner or peptide synthesis to give a final peptide of any number of amino acids, one of which at least is the phthalylated ornithine. Such compounds, which are also of the general Formula I, are useful as intermediates in forming the corresponding arginine containing peptides.

To prepare the arginine derivatives, the protecting phthalyl group is removed as described hereinbefore and the delta-amino group is converted to a guanidino group as also described hereinbefore. Although such dephthalylation and guanylation steps are preferably carried out as the last steps in the process prior only to the removal of other protecting group(s) still present, so as to prevent interference by the guanidino groups, these steps may be done at any time.

The following examples illustrate the invention (all temperatures being in centigrade). Although the preparation of only three known biologically active peptides, namely, arginine vasopressin, arginine vasotocin and histidylphenylalanyl-arginyl-tryptophyl-glycine, are specifically disclosed, these examples illustrate the general method of this example and the general use of the new intermediates thereof and therefore should not be considered to be limitative of the scope of the invention.

EXAMPLE 1

$N^\delta$-phthalyl-L-ornithine hydrochloride (a) Preparation of the copper complex of $N^\delta$-phthalyl-ornithine: L-ornithine monohydrochloride (16.85 g.) is dissolved in water (175 ml.) containing sodium hydroxide (8.0 g.). Cupric sulfate (5H$_2$O) (12.5 g.) in 175 ml. of water is mixed with the above solution producing a deep blue color. Sodium bicarbonate (10 g.) and carbethoxy phthalimide (25 g.) are added and the reaction mixture is stirred for ½ hour. The blue precipitate which appears is washed with water, ethanol, chloroform and ether, in that sequence. The product weighs about 28 g. (94%).

(b) Preparation of $N^\delta$-phthalyl-L-ornithine hydrochloride: The copper salt of phthalyl ornithine (5.0 g., 17 mmole) of step (a) is powdered and stirred with 6 N HCl (25 ml.) for one hour, and then filtered on a fritted glass filter and washed with 6 N HCl until the filtrate is nearly colorless (50 ml.). The $N^\delta$-phthalyl-L-ornithine hydrochloride is sucked "dry" on the filter.

EXAMPLE 2

$N^\alpha$-benzyloxycarbonyl-$N^\delta$-phthalyl-L-orinthine

The $N^\delta$-phthalyl-L-ornithine hydrochloride obtained in Example 1 is dissolved in water (250 ml.). KHCO$_3$ (0.5 N) is added until the solution is neutral and then an additional 100 ml. of water is added. Carbobenzoxy chloride (2.9 ml.) is added and the mixture is stirred vigorously for 3 hours. Sodium bicarbonate (1.5 g.) is added and the stirring is continued for another 4 hours. The reaction mixture is extracted with ethyl acetate (500 ml.) and the ethyl acetate is in turn extracted with 0.5 N KHCO$_3$. The two aqueous phases are combined and acidified with 6 N HCl. An oil appears and soon crystallizes. The product is disintegrated, filtered and washed well with H$_2$O. The $^\alpha$-benzyloxycarbonyl-$N^\delta$-phthalyl ornithine weighs about 4.47 g. (66%), M.P. 129–131° with sintering at 125.5°. Recrystallization from ethyl acetate-ether-hexane does not change the melting point.

Analysis.—Calcd. for $C_{21}H_{20}O_6N_2$ (percent): C, 63.63; H, 5.09; N, 7.07. Found (percent): C, 63.70; H, 5.12; N, 7.30.

EXAMPLE 3

$N^\alpha$-benzyloxycarbonyl-$N^\delta$-phthalyl-ornithine p-nitrophenyl ester $N^\alpha$-benzyloxycarbonyl-$N^\delta$-phthalyl-ornithine (12 g., 30 mM.) is dissolved with heating in a solution of p-nitrophenol (4.8 g.) in ethyl acetate (120 ml.). The solution is cooled in an ice bath and dicyclohexylcarbodiimide (6.18 g.) is added. After one-half hour it is allowed to come to room temperature. Three and one-half hours later acetic acid (0.6 ml.) is added and in ten minutes the dicyclohexylurea is filtered off and washed with ethyl acetate (60 ml.). The precipitate then is triturated with ethyl acetate (4×50 ml.) to separate any of the product which might have precipitated with it. The combined ethyl acetate mother liquor and washings are evaporated in vacuo. The residue is suspended in 95% ethanol, re-evaporated and finally transferred to a filter and washed with 95% ethanol. The dry product weighs about 13.66 g. (88%), M.P., about 133–135°.

Analysis.—Calcd. for $C_{27}H_{23}O_8N_3$ (percent): C, 62.66; H, 4.48; N, 8.12. Found (percent): C, 62.65; H, 4.51; N, 7.88.

EXAMPLE 4

$N^\alpha$-benzyloxycarbonyl-$N^\delta$-phthalyl-L-ornithyl-glycinamide

Glycinamide hydrobromide (7.6 g., 50 mM.) is dissolved in 120 ml. of dimethylformamide. The solution is neutralized with triethylamine and more triethylamine (6 ml.) is added followed by $N^\alpha$-benzyloxycarbonyl-$N^\delta$-phthalyl-ornithine-p-nitrophenyl ester (20.7 g., 40 mM.). The next day acetic acid is added until the reaction mixture is neutral and then is poured onto ice and diluted with water (about 300 ml.). The precipitate is filtered and washed well with water. The dry product weighs about 18.16 g., M.P. about 186–192°. It is recrystallized from hot 95% ethanol (400 ml.). The crystals are filtered and washed with 95% ethanol and then ethyl acetate. The weight of this product is about 13.59 g. and it melts at about 192.5–195°. A second crop obtained by concentration of the recrystallization mother liquor weighs about 2.23 g., M.P. about 190–193.5°; $[\alpha]_D^{21}$ 6.6 (C2, dimethylformamide +1% acetic acid). The total yield is about 87.5%.

EXAMPLE 5

Benzyloxycarbonyl-L-prolyl-$N^\delta$-phthalyl-L-ornithylglycinamide $N^\alpha$-benzyloxycarbonyl-$N^\delta$-phthalyl-L - ornithyl - glycinamide (10.36 g. 22.92 mM.) is dissolved in warm acetic acid and HBr in acetic acid (57 ml.) (40%) is added. After one hour at room temperature the HBr salt is precipitated by the addition of ether (1700 ml.). The precipitate is filtered, washed with ether and dried briefly in vacuo before dissolution in dimethylformamide (57 ml.). The solution is neutralized with triethylamine (5 ml.), followed by an additional 3.5 ml. of triethylamine. N-benzyloxycarbonyl-L-proline p-nitrophenyl ester (9.33 g.) is added to the reaction mixture which is left at room temperature overnight. The mixture is neutralized with acetic acid, poured onto ice and diluted with water to 1 liter. An oil appears, a small aliquot of which is crystallized from ethyl acetate and used to seed the rest. The crystals are filtered, washed with water and dried in vacuo over phosphorous pentoxide. A suspension of the crystals (13.5 g. [calcd. 12.6 g.], M.P. 176–191°) in ethyl acetate (450 ml.) is boiled, cooled and filtered to yield about 10.83 g. (85.7%) of product, M.P. 195–198°. Recrystallization from 95% ethanol produces a crop which melts at about 198–199°. $[\alpha]_D^{21}$—28.6 (c. 2, dimethylformamide +1% acetic acid).

Analysis.—Calcd. for $C_{28}H_{31}O_7N_5$ (percent): C, 61.19; H, 5.69; N, 12.74. Found (percent): C, 61.16; H, 5.74; N, 12.54.

EXAMPLE 6

S-benzyl-N-benzyloxycarbonyl-L-cysteinyl-L-prolyl-N⁶-phthalyl-L-ornithylglycinamide Benzyloxycarbonyl-L-prolyl-N⁶-phthalyl - L - ornithylglycinamide (27.5 g., 50 mM.) is dissolved in warm acetic acid (125 ml.), cooled and HBr in acetic acid (125 ml.) is added. One hour later the hydrobromide is precipitated with ether, filtered and washed with ether. It is dissolved in dimethylformamide (125 ml.), neutralized with triethylamine (10 ml.) and 3 ml. of the base is added in excess before addition of S-benzyl-N-benzyloxycarbonyl-L-cysteine p-nitrophenyl ester (29.2 g., 62.5 mM.). After 2¾ hours the reaction mixture is acidified with acetic acid (5 ml.) and poured onto ice. It is diluted with water to 2 liters and seeded. The product is filtered, washed with water (about 1 liter) and dried (42 g.). It is then boiled with ethyl acetate (1 liter); and when cool, it is filtered and washed with ethyl acetate. It weighs about 31.5 g. (84.8%), M.P. about 175–178°. Recrystallization from 95% ethanol (2 liters) yields a crystalline sample, about 29.5 g. (79.4%), M.P. about 177–180°. Further recrystallization does not substantially change the melting point (about 178–180°); $[\alpha]_D^{20}$ −39.1 (c. 2, dimethylformamide +1% acetic acid).

*Analysis.*—Calcd. for $C_{42}H_{48}O_{10}N_8S$ (percent): C, 61.44; H, 5.70; N, 11.31; S, 4.32. Found (percent): C, 61.68; H, 5.70; N, 11.65; S, 4.61.

EXAMPLE 7

Benzyloxycarbonyl-L-asparaginyl-S-benzyl-L-cysteinyl-L-prolyl-N⁶-phthalyl-L-ornithylglycinamide S - benzyl - N-benzyloxycarbonyl-L-cysteinyl-L-prolyl-N⁶-phthalyl-L-ornithylglycinamide (2.88 g., 4 mM.) is dissolved in warm acetic acid (20 ml.). HBr in acetic acid (20 ml.) is added and the reactants are left at room temperature for one hour before the HBr salt is precipitated with 20 volumes of ether. The HBr salt is filtered on a fritted glass filter with ether and then dissolved on the filter with dimethylformamide (10 ml.). The solution is neutralized with triethylamine (2 ml.) and 0.6 ml. is added in excess, followed by 3.10 g. of benzyloxycarbonyl-L-asparaginyl p-nitrophenyl ester. Within an hour the reaction mixture solidifies. After 2 hours it is acidified with acetic acid (6 ml.) and the product is disintegrated in 95% ethanol (100 ml.), boiled with ethyl acetate (100 ml.), filtered and washed with acetone (75 ml.) and hot acetone (25 ml.). The product weighs about 3.0 g. (88%), M.P. about 213–215°. A sample recrystallized from dimethylformamide (containing 1% acetic acid) and ethyl acetate is crystalline and melts at about 213–216.5°; $[\alpha]_D^{20}$ −47.6 (c. 2, acetic acid).

*Analysis.*—Calcd. for $C_{42}H_{48}O_{10}N_8S$ (percent): C, 58.87; H, 5.65; N, 13.08; S, 3.74. Found (percent): C, 58.48; H, 5.79; N, 13.19; S, 3.88.

EXAMPLE 8

Benzyloxycarbonyl-L-glutaminyl-L-asparaginyl-S-benzyl-L-cysteinyl-L-prolyl-N⁶-phthalyl-L-ornithylglycinamide The protected pentapeptide (5.868 g., 6.85 mM.) obtained in Example 7 is dissolved in warm acetic acid (35 ml.), cooled and HBr in acetic acid (35 ml.) is added. One hour later, the hydrobromide is precipitated by addition of ether (600 ml.). It is filtered and washed with ether, and then dissolved in dimethylformamide (35 ml.), neutralized with triethylamine (3.5 ml.), and an excess (0.9 ml.) of the base is added, followed by benzyloxycarbonyl-L-glutamine p-nitrophenyl ester (3.43 g.). The reaction mixture solidifies in about one hour. After 3 hours, it is acidified with acetic acid (3.5 ml.) and disintegrated in 95% ethanol (175 ml.), filtered and washed with 100 ml. each of 95% ethanol, hot acetone, ethyl acetate, and hot ethyl acetate. The product weighs about 6.131 g. (91%), M.P. about 203–213°. A sample recrystallized from 95% ethanol is crystalline and melts at about 204–210°; $[\alpha]_D^{20}$ −59.5 (c., 2, acetic acid). It is a monohydrate.

*Analysis.*—Calcd. for $C_{47}H_{58}O_{13}N_{10}S$ (percent): C, 56.28; H, 5.79; N, 13.96; S, 3.20. (Total Volatiles 1.8). Found (percent): C, 56.23; H, 6.22; N, 13.82; S, 3.30. (Total Volatiles 2.6.)

EXAMPLE 9

Benzyloxycarbonyl-L-phenylalanyl - L - glutaminyl - L-asparaginyl - S-benzyl-L-cysteinyl-L-prolyl-N⁶-phthalyl-L-ornithylglycinamide The protected hexapeptide obtained in Example 8 (4.0 g., 4 mM.) is treated with HBr in acetic acid in the usual manner to remove the benzyloxycarbonyl group. The hydrobromide is dissolved in dimethylformamide (24 ml.). The solution is neutralized with triethylamine (2 ml.) plus an excess of 0.6 ml. Benzyloxycarbonyl-L-phenylalanine p-nitro-phenyl ester (1.05 g., 5 mM.) is added. In about one hour the reaction mixture has solidified. After 3½ hours it is acidified with acetic acid (2 ml.) and disintegrated in 95% ethanol (100 ml.). It is filtered and washed with 60 ml. each of 95% ethanol, acetone, ethyl acetate and hot ethyl acetate. The product weighs about 4.57 g. (quantitative yield); M.P. 214–220°. Recrystallization from 80% ethanol yields a crystalline product melting at about 219.5–225°; $[\alpha]_D^{20}$ −47.2° (c., 2, acetic acid).

*Analysis.*—Calcd. for $C_{56}H_{65}O_{13}N_{11}S$ (percent): C, 59.40; H, 5.79; N, 13.61; S, 2.83. Found (percent): C, 59.30; H, 5.85; N, 13.83; S, 2.93.

EXAMPLE 10

O-benzyl - N - benzyloxycarbonyl - L - tyrosyl-L-phenylalanyl - L - glutaminyl - L - asparaginyl - S - benzyl-L-cysteinyl-L-prolyl-N⁶-phthalyl-L-ornithylglycinamide The protected heptapeptide obtained in Example 9 (2.264, 2 mM.) is treated with acetic acid (10 ml.)+HBr in acetic acid (10 ml.) at room temperature for one hour. Ether (about 400 ml.) is added. The precipitate is collected on a fritted glass filter, washed with ether and then dissolved on the filter with dimethylformamide (10 ml.). After neutralizing the solution with triethylamine (1.0 ml.), an excess (0.3 ml.) is added, followed by O-benzyl-N-benzyloxycarbonyl-L-tyrosine p-nitrophenyl ester (1.32 g., 2.5 mM.). Four hours later, the now semi-solid reaction mixture is acidified with acetic acid (1 ml.) and disintegrated in 95% ethanol (50 ml.). It is filtered and washed with 30 ml. each of 95% ethanol, acetone, ethyl acetate and hot ethyl acetate. The crystalline product weighs about 2.606 g. (94%), M.P. about 232–236°. Recrystallization from 80% ethanol does not change the melting point, $[\alpha]_D^{20}$ −38.5° (c., 2, acetic acid).

*Analysis.*—Calcd. for $C_{72}H_{80}O_{15}N_{12}S$ (percent): C, 62.41; H, 5.82; N, 12.13; S, 2.31. Found (percent): C, 63.06; H, 6.18; N, 12.25; S, 2.40.

EXAMPLE 11

S-benzyl-N-benzyloxycarbonyl - L - cysteinyl-L-tyrosyl-L-phenylalanyl-L-glutaminyl - L - asparaginyl-S-benzyl-L-cysteinyl-L-prolyl-N⁶-phthalyl-L-ornithylglycinamide The benzyloxycarbonyl group is removed from the octapeptide obtained in Example 10 (2.771 g., 2 mM.) in the usual manner. The hydrobromide is dissolved in dimethylformamide (10 ml.), neutralized with triethylamine (1.2 ml.) plus an excess (0.4 ml.) and S-benzyl-N-benzyloxycarbonyl-L-cysteine p-nitrophenyl ester (1.166 g., 2.5 mM.) is added. It is left at room temperature for 3¾ hours and acetic acid (1.2 ml.) is added to the solidified reaction mixture before disintegrating it in 95% ethanol (50 ml.). The product is filtered and washed as in Example 10. It weighs about 2.859 g. (96%), M.P. about 222–234.5°. A sample recrystallized from 80% ethanol melts at about (225) 230–235°; $[\alpha]_D^{20}$ −44.1° (c., 2, acetic acid).

*Analysis.*—Calcd. for $C_{75}H_{85}O_{16}N_{13}N_2$ (percent): C, 60.51; H, 5.75; N, 12.23; S, 4.21. Found (percent): C, 60.46; H, 5.82; N, 11.97; S, 4.57.

EXAMPLE 12

S-benzyl-N-benzyloxycarbonyl - L - cysteinyl-L-tyrosyl-L-phenylalanyl-L-glutaminyl - L - asparaginyl-S-benzyl-L-cysteinyl-L-prolyl-L-ornithylglycinamide and 8-L-ornithine vasopressin (a) Preparation of S-benzyl-N-benzyloxycarbonyl-L-cysteinyl - L - tyrosyl - L - phenylalanyl-L-glutaminyl-L-asparaginyl-S-benzyl - L - cysteinyl-L-prolyl-L-ornithylglycinamide: N - benzyloxycarbonyl-S-benzyl-L-cysteinyl-L-tyrosyl-L-phenylalanyl - L - glutaminyl-L-asparaginyl-S-benzyl-L-cysteinyl-L-prolyl-$N^\delta$-phthalyl - L - ornithinyl glycinamide (1.5 g., 1 mM.) is dissolved with heating in dimethylformamide (10 ml.). A molar solution of hydrazine (3 ml.) in dimethylformamide is added. After 3 hours the mixture is acidified with acetic acid (1.5 ml.) and evaporated in vacuo. Water (10 ml.) is added to the residue. The next day the precipitate is filtered and washed with water. It is dried at 35° over phosphorous pentoxide and weighs about 1.568 g.

(b) Preparation of 8-L-ornithine vasopressin: 250 mg. of S-benzyl-N-benzyloxycarbonyl-L-cysteinyl-L-tyrosyl-L-phenylalanyl-L-glutaminyl - L - asparaginyl-S-benzyl-L-cysteinyl-L-prolyl-L-ornithylglycinamide is reduced with sodium in liquid ammonia (250 ml.) until the blue color remains for five minutes. The ammonia is evaporated and the residue is dissolved in water (250 ml.). The solution is aerated at pH 6.5 for 2 hours, producing 8-L-ornithine vasopressin which shows high biological activity in the rat pressor test (about 260 units/mg.).

EXAMPLE 13

S-benzyl-N-benzyloxycarbonyl - L - cysteinyl-L-tyrosyl-L-phenylalanyl-L-glutaminyl - L - asparaginyl-S-benzyl-L-cysteinyl-L-prolyl-L-arginylglycinamide The protected dephthalylated nonapeptide obtained in step (a) of Example 12 is dissolved in dimethylformamide (10 ml.). A solution of 1-guanyl-3,5--dimethylpyrazole $HNO_3$ (0.603 g.) in dimethylformamide (10 ml.), adjusted to pH 8–9 with triethylamine (0.4 ml.), is added and the pH of the reaction mixture is brought to 8–9 with more triethylamine (0.8 ml.). After 4 days the reaction mixture is evaporated in vacuo and the residue is suspended in water (10 ml.) and adjusted to pH 5. It is filtered, washed with water and dried, about 1.352 g. of product is obtained.

EXAMPLE 14

Arginine vasopressin

A sample of 50 mg. of the compound obtained in Example 13 is reduced with sodium in liquid ammonia (50 ml.). The ammonia is evaporated and the residue is dissolved in water (50 ml.) and aerated at pH 6.5 for 2 hours. The crude arginine vasopressin shows activity of about 330 u./mg. (in the rat pressor assay).

EXAMPLE 15

Benzyloxycarbonyl-L-isoleucyl - L - glutaminyl-L-asparaginyl-S-benzyl-L-cysteinyl - L - prolyl-$N^\delta$-phthalyl-L-ornithylglycinamide The synthesis of this compound is performed in the same manner as described in Example 9 using the active ester of isoleucine instead of phenylalanine. It is completed with an 83% yield, M.P. about 223–230°. Recrystallization from 80% ethanol produces a material melting at about 230–232°; $[\alpha]_D^{23}$ —56° (c., 2, acetic acid).

*Analysis.*—Calcd. for $C_{53}H_{67}O_{13}N_{11}S$ (percent): C, 57.96; H, 6.15; N, 14.03; S, 2.92. Found (percent): C, 58.06; H, 6.21; N, 14.07; S, 2.90.

EXAMPLE 16

O-benzyl-N-benzyloxycarbonyl - L - tyrosyl-L-isoleucyl-L-glutaminyl - L - asparaginyl - S - benzyl-L-cysteinyl-L-prolyl-$N^\delta$-phthalyl-L-ornithylglycinamide O - benzyl-N-benzyloxycarbonyl-L-tyrosyl-L-isoleucyl-L-glutaminyl - L - asparaginyl - S - benzyl-L-cysteinyl-L-prolyl-$N^\delta$-phthalyl - L - ornithylglycinamide is obtained through the same methods described in Example 10. This yield is 78%, M.P. about 234–240° Two recrystallizations from acetic acid-ethanol produces a purified peptide which melts at 240–245°; $[\alpha]_D^{23}$ —42.4° (c., 2, acetic acid).

*Analysis.*—Calcd. for $C_{69}H_{82}O_{15}N_{12}S$ (percent): C, 61.32; H, 6.12; N, 12.44; S, 2.37. Found (percent): C, 61.43; H, 6.18; N, 12.25; S, 2.48.

EXAMPLE 17

S-benzyl-N-benzyloxycarbonyl - L - cysteinyl-L-tryosyl-L-isoleucyl-L-glutaminyl - L - asparaginyl - S - benzyl - L-cysteinyl-L-prolyl-$N^\delta$-phthalyl-ornithylglycinamide The techniques employed in the synthesis of this protected nonapeptide amide are identical to those used in the preparation of the peptide of Example 11. The product is obtained in 93% yield, M.P. about 242–251°. After recrystallization from acetic acid-ethanol the melting point is about 245–253°; $[\alpha]_D^{24}$—49.3° (c., 2, acetic acid). Further recrystallization from the same solvent raises the melting point to about 257–261°.

*Analysis.*—Calcd. for $C_{72}H_{87}O_{16}N_{13}S_2$ (percent): C, 59.45; H, 6.03; N, 12.52; S, 4.41. Found (percent): C, 59.52; H, 5.96; N, 12.53; S, 4.37.

EXAMPLE 18

S-benzyl-N-benzyloxycarbonyl - L - cysteinyl-L-tyrosyl-L-isoleucyl-L-glutaminyl - L - asparaginyl - S - benzyl - L-cysteinyl-L-prolyl - L - ornithylglycinamide and 8-L-ornithine vasotocin (8-L-ornithine oxytocein)

The phthalyl group of the compound of Example 17 is removed by the same method used in Example 12 and S-benzyl-N-benzyloxycarbonyl - L - cysteinyl-L-tyrosyl-L-isoleucyl - L - glutaminyl - L - asparaginyl-S-benzyl-L-cysteinyl-L-prolyl - L - ornithylglycinamide is obtained in 88% yield.

A sample (250 mg.) of S-benzyl-N-benzyloxycarbonyl-L-cyteinyl-L-tyrosyl-L-isoleucyl-L-glutaminyl-L-asparaginyl-S-benzyl-L-cysteinyl-L-prolyl - L - ornithylglycinamide is reduced and aerated in the same manner as described in Example 12. The 8-L-ornithine vasotocin (8-L-ornithine oxytocin) shows biological activity of about 90 units/mg. in the rat pressor test.

EXAMPLE 19

S-benzyl-N-benzyloxycarbonyl - L - cysteinyl-L-tyrosyl-L-isoleucyl-L-glutaminyl - L - asparaginyl - S - benzyl-L-cysteinyl-L-prolyl-L-arginylglycinamide Guanylation of the first compound obtained in Example 18 is performed by the procedure described in Example 13. The guanylated product is produced in 90% yield, M.P. about 225–232° (decomposition).

EXAMPLE 20

Arginine vasotocin

The compound of Example 19 is reduced and aerated to form the cyclic product arginine vasotocin. It shows biological activity of about 100 units/mg. in the rat pressor test.

EXAMPLE 21

Tertiary butyl $N^\alpha$-benzyloxycarbonyl - $N^\delta$ - phthalyl-L-ornithyl-L-tryptophylglycinate (a) Preparation of tertiary butyl $N^\alpha$-benzyloxycarbonyl-L-tryptophylglycinate: Benzyloxycarbonyl-L-tryptophane nitrophenyl ester (4.6 g.) and glycine tertiary butyl ester (1.5 g.) are dissolved in ethyl acetate (7.5 ml.) and the solution kept overnight at room temperature. This reaction mixture is diluted with more ethyl acetate (ca. 100 ml.) and washed ten times with N ammonium hydroxide, once with water, twice with N hydrochloric acid, and finally twice with water. The organic layer is dried over magnesium sulfate and the solvent is removed in vacuo. The oily residue is dissolved in benzene (10 ml.) and freeze dried. The solid thus obtained (3.95 g.) is very soluble in methanol, ethanol, benzene, chloroform, acetone, acetonitrile and ether. It is insoluble in hexane or cyclohexane. From mixtures of ethyl acetate and hexane it precipitates as an oil. However, on thin layer chromatography (silica gel adsorbent; butanol, acetic acid, water, 4:1:1 as a solvent) it shows only one spot, UV absorbing and Ehrlich positive.

*Analysis.*—Calcd. for $C_{25}H_{29}N_3O_5$ (percent): C, 66.49; H, 6.47; N, 9.31. Found (percent): C, 66.46; H, 6.53; N, 9.28.

(b) Preparation of L-tryptophylglycine tertiary butyl ester oxalate: Tertiary butyl benzyloxycarbonyl-L-tryptophylglycinate (9 g.) and oxalic acid (0.9 g.) are dissolved in methanol (140 ml.) and hydrogenated for three hours in the presence of 10% palladium on charcoal (1 g.). The catalyst is removed by filtration and the filtrate is concentrated in vacuo to about 5 ml. Oxalic acid (1 g.) dissolved in methanol (10 ml.) and finally ether (ca. 300 ml.) are added to precipitate the crystalline oxalate that is filtered and washed with ether. Yield about 6.7 g., M.P. about 178–180°.

*Analysis.*—Calcd. for $C_{19}H_{25}N_3O_7$ (percent): C, 56.02; H, 6.18; N, 10.35. Found (percent): C, 56.10; H, 6.24; N, 10.57.

(c) Preparation of tertiary butyl $N^α$-benzyloxycarbonyl-$N^δ$-phthalyl-L-ornithyl - L - tryptophylglycinate: Tryptophylglycinate tertiary butyl ester oxalate (4.5 g.) is dissolved in methanol (10 ml.) and the solution applied to a column of Amberlyst XN 1003. The free base is eluted with methanol, until the eluate is neutral. This methanolic solution is concentrated to dryness in vacuo and the oily residue is dissolved together with $N^α$-benzyloxycarbonyl-$N^δ$-phthalyl-L-ornithine (4 gms.) in tetrahydrofuran (50 ml.). The solution thus obtained is filtered from a small insoluble residue and the filtrate is cooled in an ice water bath. Dicyclohexylcarbodiimide (2.1 g.) is added and the mixture is stirred in the ice-water bath for 6 hours and overnight at room temperature. The precipitate of dicyclohexylurea is filtered off and washed with ethyl acetate (ca. 200 ml.). The filtrate is washed with dilute hydrochloric acid, saturated sodium bicarbonate solution and finally with water, and dried over magnesium sulfate. After removing the solvent in vacuo, the residue is disintegrated under ether, filtered and crystallized from chloroform-hexane (6:1) to yield about 5.2 g. of product sintering at 105°, M.P. about 123–126°. A small sample, recrystallized from chloroform-hexane and dried overnight at room temperature, melts at about 123–128° with sintering at 113–116°.

*Analysis.*—Calcd. for $C_{38}H_{41}N_5O_8$ (percent): C, 65.60; H, 5.94; N, 10.07. Found (percent): C, 65.24; H, 6.19; N, 10.26.

The same product in similar yield is obtained by coupling $N^α$-benzyloxycarbonyl-$N^δ$-phthalyl - L - ornithine nitrophenyl ester to tryptophylglycine tertiary butyl ester oxalate in the presence of triethylamine.

EXAMPLE 22

Tertiary butyl $N^α$-benzyloxycarbonyl - L - phenylalanyl-$N^δ$-phthalyl-L-ornithyl-L-tryptophylglycinate Tertiary butyl $N^α$ - benzyloxycarbonate-$N^δ$-phthalyl-L-ornithyl-L-tryptophylglycinate (7.7 g.) is dissolved in a mixture of acetic acid (90 ml.) and methanol (90 ml.) and hydrogenated for seven hours in the presence of 10% Pd on charcoal (1.6 g. at the start and 1.6 g. more after three hours). The catalyst is removed by filtration and the filtrate is concentrated in vacuo to a thick oil, diluted with benzene and freeze dried. The solid residue thus obtained is dissolved together with benzyloxycarbonyl-L-phenylalanine nitrophenyl ester (4.85 g.) in pyridine (18 ml.).

After twenty-four hours storage at room temperature the reaction mixture is concentrated in vacuo to near dryness, diluted with ethanol and concentrated again. A crystalline residue is obtained that is suspended in ethyl acetate and concentrated to dryness. This process is repeated twice more. Yield about 7.35 g., M.P. about 167–169°.

*Analysis.*—Calcd. for $C_{47}H_{50}N_6O_9$ (percent): C, 66.99; H, 5.98; N, 9.97. Found (percent): C, 67.13; H, 6.13; N, 10.17.

EXAMPLE 23

Tertiary butyl $N^α$-benzyloxycarbonyl-L-histidyl-L-phenylanalyl-$N^δ$-phthalyl-L-ornithyl-L-tryptophylglycinate Tertiary butyl benzyloxycarbonyl-L-phenylalanyl-$N^δ$-phthalyl-L-ornithyl-L-tryptophylglycinate (1.68 g.) is dissolved in a mixture of acetic acid (45 ml.) and methanol (45 ml.) and hydrogenated in the presence of 10% palladium on charcoal (3.20 mg. at the start and another 320 mg. after three hours). The catalyst is removed by filtration and the filtrate is concentrated in vacuo to a heavy oil that is diluted with benzene and freeze dried. The solid residue is dissolved in pyridine (4 ml. and added to a solution of $N^α$-benzyloxycarbonyl-L-hystidine azide in ethyl acetate (prepared from 666 mg. of $N^α$-benzyloxycarbonyl-L-hystidine hydrazide).

After twenty-four hours storage at 5° the semisolid mass is distintegrated under ether, filtered and washed with ether. This crude product (about 1.78 g., M.P. about 165–174 sintering since 155°) is submitted to a counter-current distribution in the system toluene-chloroform-methanol-water 5:5:8:2. After 50 transfers, the machine is scanned by weighing the residues of the evaporation of 10 ml. portions withdrawn from each third tube. Only one significant peak is observed (K 0.50) for which the experimental and theoretical curve are in close agreement. The material isolated from this peak (1.38 g.) melts at about 169–174, sintering since 160°. It is soluble in hot absolute ethanol, methanol, acetonitrile and chloroform, on cooling it precipitates as an amorphous solid.

*Analysis.*—Calcd. for $C_{53}H_{57}N_2O_9$ (percent): C, 64.95; H, 5.86; N, 12.86. Found (percent): C, 64.88; H, 5.86; N, 12.71.

EXAMPLE 24

Tertiary butyl $N^α$-benzyloxycarbonyl-L-histidyl-L-phenylalanyl-L-ornithyl-L-tryptophylglycinate Tertiary butyl - $N^α$ - benzyloxycarbonyl - L - histidyl-L-phenylalanyl-$N^δ$-phthalyl - L - ornithyl - L - tryptophylglycinate (500 mg.) is dissolved in a mixture of methanol (2.5 ml.) and chloroform (1.0 ml.). A 2 M methanolic solution of hydrazine (1 ml.) is added, the solution is kept at room temperature for 3 hours and finally acidified with 4 M acetic acid in methanol. After overnight cooling the precipitate of phthalyl hydrazide is removed by filtration and the filtrate concentrated to dryness in vacuo. The residue is extracted with five 10 ml. portions of 20% aqueous acetic acid. The combined extracts are filtered and the filtrates freeze dried. Yield about 430 mg.

EXAMPLE 25

L-histidyl-L-phenylalanyl-L-ornithyl-L-tryptophylglycine

Tertiary butyl $N^α$ - benzyloxycarbonyl - L - histidyl-L-phenylalanyl-L-ornithyl-L-tryptophylglycinate (250 mg.) is dissolved in glacial acetic acid (5 ml.) and to the solution thus obtained another of hydrobromic acid in glacial acetic acid (5 ml.) is added. All these operations, and the subsequent storage at room temperature for one and three quarters of an hour, are performed under a nitrogen atmosphere. Ether (100 ml.) is added and the precipitate formed is filtered and thoroughly washed with ether. The crude free pentapeptide hydrobromide (228 mg.) is purified by ion exchange chromatography on carboxymethyl cellulose. The purified product is found to be homogeneous when analyzed by paper chromatography (BuOH:ACOH:$H_2O$; 4:1:5)

and paper electrophoresis.

EXAMPLE 26

L-histidyl-L-phenylalanyl-L-argingyl-L-tryptophylglycine

Tertiary butyl $N^\alpha$ - benzyloxycarbonyl - L - histidyl - L - phenylalanyl-L-ornithyl-L-tryptophylglycinate (240 mg.) is dissolved in trifluoroacetic acid (3 ml.) and the solution kept at room temperature for fifteen minutes. All these operations are performed under a nitrogen atmosphere. Ether (50 ml.) is added and the precipitate is filtered, washed thoroughly with ether and dried in vacuo over potassium hydroxide. The $N^\alpha$-benzyloxycarbonyl-L-histidyl-L-phenylalanyl-L-ornithyl - L - tryptophylglycine thus obtained (about 203 mg.) is dissolved), together with 1-guanyl-3,5-dimethylpyrazole nitrate (120 mg.) in a mixture of dimethylformamide (1.2 ml.) and triethylamine (0.24 ml.). The solution is kept for 4 hours at 38°–40° and 60 hours at room temperature and finally diluted with water (10 ml.). The precipitate formed is separated from the mother liquors by centrifugation and dried in vacuo (178 mg.). The benzyloxycarbonyl group is removed by dissolving this residue in a mixture of acetic acid (4 ml.) and hydrobromic acid in acetic acid (4 ml.) under a nitrogen atmosphere. The solution is kept at room temperature for one hour, diluted with ether and the precipitated formed is filtered and washed thoroughly with ether.

This crude hydrobromide (190 mg.) is purified and converted into the acetate by ion exchange chromatography in carboxymethylcellulose. The purified product is shown to be identical with an authentic sample of histidyl-phenyl-alanyl-arginyl-tryptophylglycine (prepared according to K. Hofmann and S. Lande, J.A.C.S. 83, 2286 (1961)) by paper chromatography and paper electrophoresis.

Although in each of the above examples, and especially Example 1, carbethoxyphthalimide is used to yield the corresponding $N^\delta$-phthalyl-L-ornithine derivative, other carbethoxyphthalimides may also be used to yield the corresponding $N^\delta$-(substituted phthalyl)-L-ornithine derivatives.

What is claimed is:

1. 8-L-ornithine vasotocin.

References Cited

UNITED STATES PATENTS

| | | | |
|---|---|---|---|
| 2,498,665 | 2/1958 | Emerson | 260—112.5 |
| 3,164,614 | 1/1965 | Nicholaides et al. | 260—345.8 |
| 3,247,178 | 4/1966 | Schwyzer et al. | 260—112.5 |
| 3,299,036 | 1/1967 | Boissonnas et al. | 260—112.5 |
| 3,228,926 | 1/1966 | Kappeler et al. | 260—112.5 |
| 3,247,180 | 4/1966 | Schwyzer et al. | 260—112.5 |

OTHER REFERENCES

Barrass et al., J. Chem. Soc. 1957, 3134–3139.
Bannard et al., Can. J. Chem. 36, 1541–1549 (1958).
Huguenin et al., Helv. Chim. Acta. 46, 1669–1676 (1963).
Meienhofer et al., J. Chem. Soc. 82, 6336–6337 (1960).
Boissonnas et al., II, Experientia 17, 377–390 (1961).
Kimbrough et al., J. Biol. Chem. 236, 778–780 (1961).

LEWIS GOTTS, Primary Examiner

M. M. KASSENOFF, Assistant Examiner

U.S. Cl. X.R.

260—326, 438.1, 564; 424—177

PO-1050
(5/69)

UNITED STATES PATENT OFFICE
CERTIFICATE OF CORRECTION

Patent No. __3,562,244__     Dated __February 9, 1971__

Inventor(s) __Miklos Bodanszky and Miguel A. Ondetti__

It is certified that error appears in the above-identified patent and that said Letters Patent are hereby corrected as shown below:

Column 1, line 30, that portion of the formula reading and on line 52, "coversion" should read – – conversion – –; and on line 60, "case" should read – – ease – –. Column 2, formula (I), that portion reading

and on line 22, "p-sulfonphenyl," should read – – p-sulfophenyl – –; and on line 49, "reaction" should read – – reacting – –. Column 3, line 69, "The $^{\alpha}$-" should read – – The $N^{\alpha}$- – –. Column 5, line 26, "$C_{42}H_{48}O_{10}N_8S$" should read – – $C_{38}H_{42}O_8N_6S$ – –; and on line 55, "58.48" should read – – 58.49 – –. Column 8, line 38, "oxytocein)" should read – – oxytocin) – –. Column 9, line 36, "phylglycinate" should read – – phylglycine – –. Column 10, line 20, "analyl" should read – – alanyl – –. Column 11, line 26, "dissolved)," should read – – dissolved, – and on line 39, "itated" should read – – itate – –.

Signed and sealed this 15th day of June 1971.

(SEAL)
Attest:

EDWARD M. FLETCHER, JR.
Attesting Officer

WILLIAM E. SCHUYLER, JR.
Commissioner of Patents